US012623771B2

(12) United States Patent
Narasimhulu et al.

(10) Patent No.: US 12,623,771 B2
(45) Date of Patent: May 12, 2026

(54) SYSTEM AND METHOD FOR OPERATING AN AIRCRAFT IN A REQUIRED TIME OF ARRIVAL MODE

(71) Applicant: THE BOEING COMPANY, Arlington, VA (US)

(72) Inventors: Veeresh Kumar Masaru Narasimhulu, Sammamish, WA (US); Joost Edwin Koennen, Meppel (NL)

(73) Assignee: The Boeing Company, Arlington, VA (US)

( * ) Notice: Subject to any disclaimer, the term of this patent is extended or adjusted under 35 U.S.C. 154(b) by 27 days.

(21) Appl. No.: 18/595,606

(22) Filed: Mar. 5, 2024

(65) Prior Publication Data

US 2025/0282472 A1    Sep. 11, 2025

(51) Int. Cl.
B64C 19/00    (2006.01)
B64C 19/02    (2006.01)

(52) U.S. Cl.
CPC ................................... B64C 19/02 (2013.01)

(58) Field of Classification Search
CPC ......... B64C 19/02; B64C 19/00; B64C 11/00; B64C 1/00
USPC ........................................................... 701/3
See application file for complete search history.

(56) References Cited

U.S. PATENT DOCUMENTS

| | | | | |
|---|---|---|---|---|
| 9,043,051 | B1 | 5/2015 | Barber | |
| 9,159,240 | B2 | 10/2015 | Cornell | |
| 2020/0168106 | A1 | 5/2020 | De Prins | |
| 2021/0390863 | A1* | 12/2021 | Kanagarajan | G08G 5/55 |
| 2022/0051573 | A1* | 2/2022 | Crouch | G08G 5/34 |
| 2022/0215760 | A1* | 7/2022 | Jorgensen | G08G 5/52 |

FOREIGN PATENT DOCUMENTS

| | | |
|---|---|---|
| CN | 114049795 | 2/2022 |
| EP | 3926606 | 12/2021 |

OTHER PUBLICATIONS

Extended European Search Report for EP 25160931.9-1009, dated Jul. 17, 2025.

* cited by examiner

*Primary Examiner* — Shardul D Patel
(74) *Attorney, Agent, or Firm* — Joseph M. Butscher; Carroll, Hoette & Butscher LLC

(57)    ABSTRACT

A system and a method for operating an aircraft in a required time of arrival (RTA) mode include a control unit configured to adapt one or more RTA parameters for the RTA mode of the aircraft based tail-specific data for the aircraft, and/or weather conditions at different locations along a flight path of the aircraft in the RTA mode.

20 Claims, 4 Drawing Sheets

Receive RTA
inputs — 300

Receive weather
conditions — 302

Assign weights
to legs of a
flight plan — 304

Assign time targets
for each leg — 306

Determine air speeds
for target times
closest to optimal
economy airspeed — 308

SYSTEM AND METHOD FOR OPERATING AN AIRCRAFT IN A REQUIRED TIME OF ARRIVAL MODE

FIELD OF THE DISCLOSURE

Examples of the present disclosure generally relate to systems and methods for operating an aircraft in a required time of arrival (RTA) mode.

BACKGROUND OF THE DISCLOSURE

Aircraft are used to transport passengers and cargo between various locations. Numerous aircraft depart from and arrive at a typical airport every day.

As air traffic increases, an aircraft arriving on time at an arrival airport and/or at a certain waypoint is a major factor for air traffic management. An airline can be penalized for a flight not arriving on time, such as by an airport, and/or due to an impact on an operational schedule (for example, cargo operators).

When pilots are faced with time constraints on a flight, they may opt to use a required time of arrival (RTA) mode. The RTA mode allows a pilot to enter a time at a certain point or destination. A flight management computer can then calculates a flight time for the RTA mode. In the RTA mode, the flight management computer then switches to a selected speed and flies the aircraft at fixed airspeed to aim for an exact required time of arrival at an arrival airport.

However, flying an aircraft at a fixed airspeed can be inefficient. Additionally, an inaccuracy of the RTA mode may force an aircraft to compensate, such as by speeding up (or slowing down) to arrive at a location at a particular time. In so doing, the aircraft may burn an increased amount of fuel to make up for lost time.

In general, the RTA mode can be an inefficient and inaccurate tool to meet time constraints.

SUMMARY OF THE DISCLOSURE

A need exists for a system and a method for efficiently and effectively operating an aircraft in a required time of arrival (RTA) mode. With that need in mind, certain examples of the present disclosure provide a system for operating an aircraft in a required time of arrival (RTA) mode. The system includes a control unit configured to adapt one or more RTA parameters for the RTA mode of the aircraft based on tail-specific data for the aircraft, and/or weather conditions at different locations along a flight path of the aircraft in the RTA mode.

In at least one example, the control unit is onboard the aircraft.

The weather conditions are received from a weather sub-system. The weather conditions include current weather conditions and predicted weather conditions at the different locations along the flight path.

In at least one example, the one or more RTA parameters include an airspeed and an altitude.

In at least one example, the different locations include different legs of the flight path. As a further example, the control unit is further configured to assign different weights to the different legs of the flight path based on distances of the different legs.

In at least one example, the control unit is configured to determine the tail-specific data for the aircraft from one or more previous flights of the aircraft.

In at least one example, the control unit is further configured to adapt an airspeed of the aircraft in the RTA mode in relation to an optimal economy airspeed of the aircraft. As a further example, the control unit is further configured to determine the optimal economy airspeed of the aircraft based on the tail-specific data for the aircraft.

The control unit can be further configured to automatically operate one or more controls of the aircraft based on the one or more RTA parameters.

In at least one example, the control unit is an artificial intelligence or machine learning system.

Certain examples of the present disclosure provide a method including adapting, by the control unit, the one or more RTA parameters for the RTA mode of the aircraft based on the tail-specific data for the aircraft, and the weather conditions at the different locations along the flight path of the aircraft in the RTA mode Certain examples of the present disclosure provide an aircraft including a system for operating the aircraft in a required time of arrival (RTA) mode, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a system and a method for operating an aircraft in a required time of arrival (RTA) mode. The system and method allow a pilot to specify a required time of arrival (RTA) at a location (such as waypoint and/or arrival airport), and receive recommendations for efficient tail-specific speed profiles to fly to meet designated times while flying in an economy speed mode. In at least one example, a control unit (such as part of a flight management computer) calculates values in a backward sense from target locations, after receiving the latest weather along an intended flight path, thereby finding the most economical solution to meet the time constraints without the aircraft unnecessarily wasting fuel.

Examples of the present disclosure eliminate, minimize, or otherwise reduce RTA inefficiencies by leveraging flight data, and applying data science and aircraft performance algorithms to determine efficient airspeeds for an aircraft flying in an RTA mode. Additionally, examples of the present disclosure minimize or otherwise reduce carbon emissions by minimizing or otherwise reducing fuel burn. The systems and methods described herein refine fuel efficiency by using tail-specific performance (that is, performance of the specific, actual aircraft, in contrast to a different test aircraft), which delivers precise data compared to pre-set fixed speeds generated by flight planning systems. Certain examples of the present disclosure provide systems and methods that use tail-specific data modeling combined with iterative algorithms to find the least cost flight parameter of cost index for an RTA mode. Examples of the present disclosure provide systems and methods that increase fuel efficiency (and reduce fuel consumption) of an aircraft flying in an RTA mode.

Figure 1:
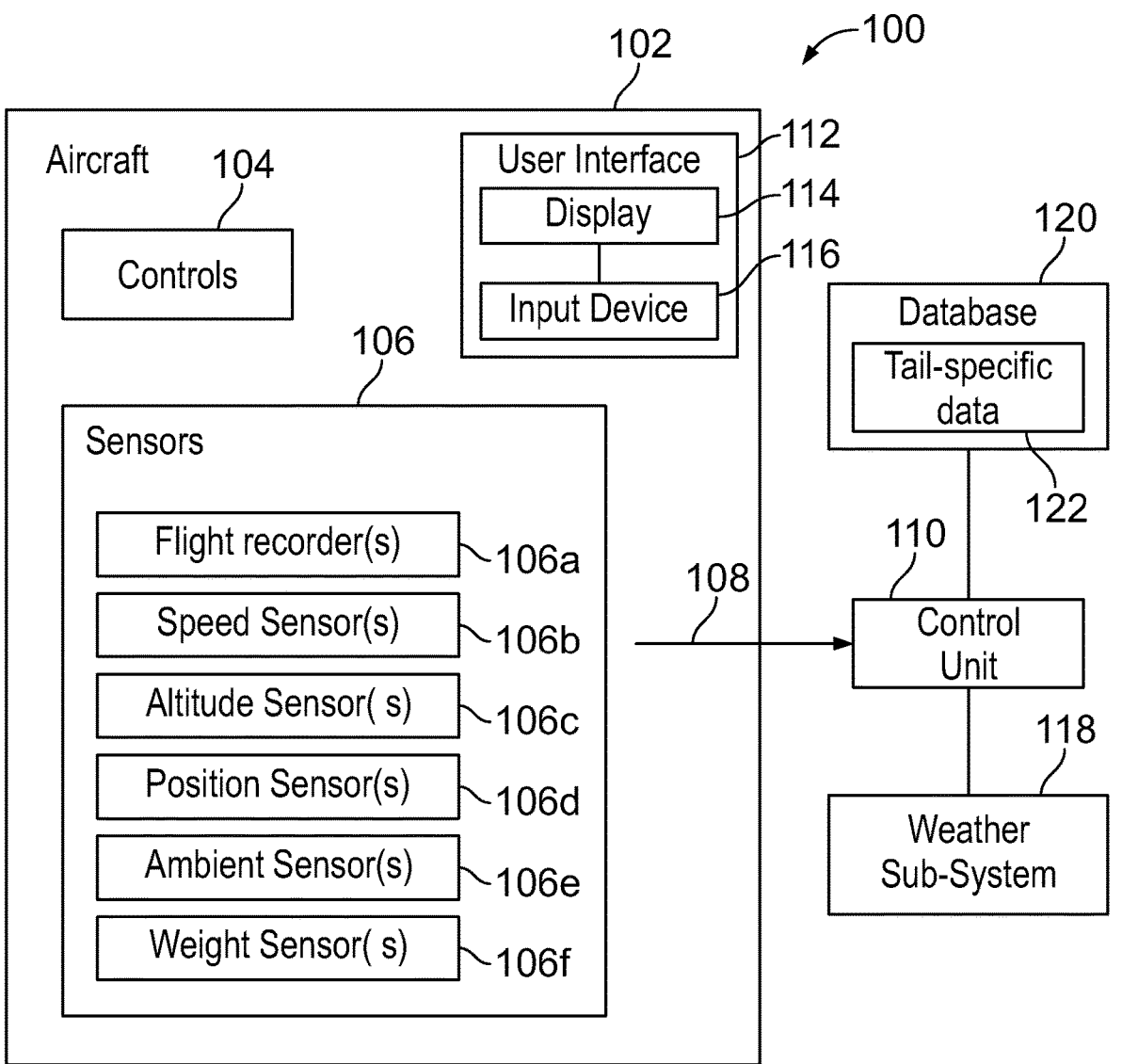
FIG. 1 illustrates a schematic block diagram of a system, according to an example of the present disclosure.

FIG. 1 illustrates a schematic block diagram of a system 100, according to an example of the present disclosure. In at least one example, the system 100 is for operating an aircraft 102 in a required time of arrival (RTA) mode. That is, the RTA mode can be stored within a flight management computer. The RTA mode is different than a normal mode of operation, in which a pilot controls operation of the aircraft without considering time targets. The RTA mode is an operational mode in which various time targets assigned to various locations along a flight path (such as different waypoints), and the aircraft is operated (such as automatically operated) to reach the different locations at the assigned time targets.

The aircraft 102 includes controls 104 that are configured to control operation of the aircraft 102. For example, the controls 104 include one or more of a control handle, yoke, joystick, control surface controls, accelerators, decelerators, and/or the like.

The aircraft 102 further includes a plurality of sensors 106 that detect various aspects of the aircraft 102. As an example, the sensors 106 include one or more flight recorders 106a that record various aspects of the aircraft 102 during a flight, including various phases, legs of a flight path, and the like. A speed sensor 106b of the aircraft 102 outputs a speed signal indicative of a ground and/or air speed of the aircraft 102. An altitude sensor 106c of the aircraft 102 outputs an altitude signal indicative of an altitude of the aircraft 102. A position sensor 106d outputs a position signal of the aircraft. As an example, the position signal can be an automatic dependent surveillance-board (ADS-B) signal. As another example, the position signal can be a global positioning system (GPS) signal that is monitored by a corresponding GPS monitor. In at least one example, GPS allows for determination of position, and ADS-B provides a transmission system to broadcast the position, which can be determined through GPS and/or inertial sensors.

The sensors 106 can also include one or more ambient sensors 106e. For example, an ambient sensor 106e can include a temperature sensor that is configured to detect an ambient temperature surrounding the aircraft 102. As another example, an ambient sensor 106e can include a wind speed sensor.

The sensors 106 can also include one or more weight sensors 106f. For example, the weight sensors 106f can include a sensor that is configured to detect an overall weight of the aircraft. As another example, the weight sensors 106f can include a sensor that is configured to detect a fuel weight within the aircraft 102. As another example, the weight sensors 106f can include a sensor configured to determine a center of gravity of the aircraft 102.

The sensors 106 can include more or less sensors than shown. The sensors 106 can detect additional aspects of the aircraft 102 other than position, speed, and altitude. For example, one or more temperature sensors can detect temperatures of one or more portions of the aircraft (such as engine temperature sensors). As another example, fuel level sensors can detect a remaining fuel level of the aircraft.

The sensors 106 output data 108 indicative of the various aspects detected thereby. For example, the data 108 includes avionics data output by the flight recorder(s) 106a. A control unit 110 is in communication with the sensors 106 through one or more wired or wireless connections, and is configured to receive the data 108 from the sensors 106.

In at least one example, the control unit 110 is onboard the aircraft 102. For example, the control unit 110 can be part of the flight management computer of the aircraft 102. As another example, the control unit 110 can be part of a handheld device (such as a smart phone or smart tablet), a portable computer, a computer workstation, and/or the like within the aircraft 102. As another example, the control unit 110 can be remote from the aircraft 102.

The aircraft 102 also includes a user interface 112, which includes a display 114 in communication with an input device 116. The display 114 can be a monitor, screen, television, touchscreen, and/or the like. The input device 116 can include a keyboard, mouse, stylus, touchscreen interface (that is, the input device 116 can be integral with the display 114), and/or the like. The user interface 112 can be part of a handheld device (such as a smart phone or smart tablet), a portable computer, a computer workstation, and/or the like within the aircraft 102. In at least one example, the control unit 110 and the user interface 112 are part of a common computing device.

The control unit 110 is also in communication with a weather sub-system 118, such as through one or more wired or wireless connections. The weather sub-system 118 can be a weather forecasting or meteorological service. As another example, the weather sub-system 118 can provide information, such as through Aircraft Communications Addressing and Reporting System (ACARS) messages. ACARS is a digital datalink system which transmits short messages between aircraft and ground stations, such as through radio signals or satellites. The control unit 110 and the weather sub-system 118 can be at different locations. Optionally, the control unit 110 and the weather sub-system 118 can be at a common location.

The control unit 110 is also in communication with a database 120 that stores tail-specific data 122 for the aircraft 102. For example, the tail-specific data 122 can include various types of information specific to the particular aircraft 102, as opposed to a general set of data for a particular type of aircraft. In at least one example, the tail-specific data 122 can be a tail-specific model for the particular aircraft 102.

In operation, the control unit 110 analyzes the tail-specific data 122 and/or the data 108 to determine efficient RTA parameters for the aircraft 102, in order for the aircraft 102 to efficiently and economically operate in an RTA mode. For example, the control unit 110 determines efficient airspeeds and altitudes for different legs of a flight path for the aircraft 102 to fly as the aircraft 102 flies in the RTA mode. Instead of relying on a generic determination for fixed airspeeds, the control unit 110 determines RTA parameters or attributes (such as airspeed and altitude) for the different legs based on actual data 108 output by the sensors 106 of the aircraft 102 during one or more actual flights of the aircraft 102. For example, the control unit 110 can determine efficient RTA parameters for a future flight of the aircraft 102 based on the data 108 from one or more previous flights. In at least one example, the control unit 110 determines the efficient RTA parameters for a future flight based on the data 108 received from an immediately prior flight of the aircraft 102. As another example, the control unit 110 determines the RTA parameters for the future flight of the aircraft based on the data 108 from a plurality of previous flights, such as the most recent 10, 20, 30, 40, or more flights of the aircraft 102. In this manner, the additional data from a plurality of flights of the aircraft 102 provides a more robust and refined determination of the RTA parameters.

In at least one example, the control unit 110 determines the efficient RTA parameters for a current or future flight of the aircraft 102 by generating one or more RTA models for the aircraft 102 based on the data 108 received from the actual aircraft 102 (that is, the specific tail associated with the aircraft 102), instead of a different aircraft or generic model.

In a least one example, the control unit 110 receives the data 108 from the sensors 106 in the form of one or more aircraft flight recording data sets, such as from the flight recorder(s) 106a. The control unit 110 analyzes the data 108 to determine an efficient (for example, optimal) speed for the actual, specific aircraft 102 from which the data 108 is recorded and output, and received by the control unit 110. As such, the control unit 110 uses real flight recording data of the specific aircraft 102 to adapt RTA performance. In at least one example, the control unit 110 receives the data 108 and generates a cost index optimization to enable easier use by pilots, and also more accurate models of the aircraft fuel burn performance during operation of the aircraft 102 in the RTA mode. The control unit 110 refines fuel efficiency by using tail-specific performance (that is, regarding the actual aircraft 102, in contrast to a different aircraft).

In operation, a pilot of the aircraft 102 activates an RTA mode of the aircraft 102. In at least one example, the control unit 110 is configured to operate the aircraft 102 according to the RTA mode. The pilot can use the input device 116 to provide RTA inputs for various legs of a flight path of the aircraft 102 between a departure airport and an arrival airport. For example, numerous waypoints exist between the departure airport and the arrival airport. A leg is between two waypoints. The pilot can enter information for a required time of arrival at each waypoint.

After receiving the RTA inputs, the control unit 110 determines distances for each leg of the flight path. The control unit 110 also receives current and predicted weather conditions, such as air temperature, wind speed and direction, and the like, for each leg, from the weather sub-system 118.

The control unit 110 then determines airspeeds (and optionally altitudes) for the aircraft 102 operating in the RTA mode for each leg. The control unit 110 determines the airspeeds and/or altitudes based on the tail-specific data 122 of the aircraft 102, and the weather conditions at the locations of the legs. In this manner, the control unit 110 adapts the RTA mode based on the tail-specific data 122 of the aircraft 102, as well as weather conditions (current and predicted), instead of relying on a fixed airspeed for the legs.

As an example, based on data 108 received from past flights, the control unit 110 can determine that the aircraft 102 flies efficiently at a particular speed, when the aircraft 102 has a particular weight, and at a particular altitude. The control unit 110 can adjust the airspeed and the altitude for the aircraft 102 at different legs of a flight path during operation in the RTA mode accordingly. Additionally, the control unit 110 can adjust the airspeeds and/or altitudes for different legs based on different weather conditions at different locations of the legs. For example, during flight of the aircraft 102 in the RTA mode, at a particular leg, a tail wind may be present. As such, the control unit 110 can adjust the airspeed of the aircraft (so as to burn less fuel), as the tailwind increases the airspeed of the aircraft 102.

In at least one example, the control unit 110 assigns weights to the different legs based on distances of the legs. The legs of the flight path may differ. The control unit 110 determines that a longer leg allows for an increased amount of time to be made up. The control unit 110 determines an optimal economy airspeed for the aircraft 102 based on the tail-specific data 122 for the aircraft 102. For a longer leg of a flight path, the control unit 110 then determines that the aircraft 102 can fly in the RTA mode closer to the optimal economy airspeed, in contrast to a shorter leg. For example, a first leg of a flight path can be 50 miles, while a second leg of the flight path can be 100 miles. The control unit 110 determines the optimal economy airspeed for the aircraft 102 to be 500 miles per hour (mph). If the control unit 110 determines that time is to be made up to arrive at a particular waypoint at a particular time, the control unit 110 can determine that the aircraft 102 is to fly at 505 mph during at least a portion of the first leg, whereas the aircraft 102 would need to fly at 520 mph during the second leg. In this manner, the control unit 110 can provide an increased weighting for the second leg, as time can be made up while flying the aircraft 102 closer to the optimal economy airspeed.

In operation, the sensors 106 detect various aspects of the aircraft 102 during a flight. For example, the sensors 106 detect various aspects of the aircraft 102 during RTA operation. The sensors 106 output the data 108 indicative of the various aspects of the aircraft 102. The control unit 110 receives the data 108 for the particular aircraft 102 (as opposed to a test or generic aircraft). The control unit 110 then determines if, based on the received data 108, the aircraft 102 will meet the predetermined time targets for RTA operation at various waypoints. If the control unit 110 determines that such time targets will be met, the aircraft 102 can maintain RTA flight at a current airspeed and altitude. If, however, the time targets for the RTA mode will not be met, the control unit 110 dynamically adjusts the airspeed and altitude for the aircraft 102, based on the tail-specific data 122 and the weather conditions, so that the aircraft 102 will arrive at the waypoints at the time targets.

In at least one example, the flight recorder(s) 106a includes an aircraft interface device and transmitter that outputs the data 108, such as avionics data, to the control unit 110. As noted, the control unit 110 is in communication with the flight recorder(s) 106a through one or more wired or wireless connections, such as through WiFi, Bluetooth, cellular, or other such connections. In at least one example, the control unit 110 determines the efficient RTA parameters and outputs a signal including data regarding the efficient RTA parameters. A flight computer receives the signal, such as through one or more wired or wireless connections, and information regarding the RTA parameters can be shown on the display 114 within the flight deck.

After the flight of the aircraft 102, the data 108 can be stored, such as in cloud servers, which can be used to perform post-flight analytics to estimate savings, further fine tune performance models, and/or the like.

In at least one example, the control unit 110 generates an optimized cost index to enable easier use by pilots and also more accurate models of the aircraft fuel burn performance during RTA flight. The control unit 110 increases fuel efficiency by using tail-specific performance, which increases precision as compared to generic speeds generated by flight planning systems.

In at least one example, for each aircraft 102 (that is, a tail) the control unit 110 uses actual flight recordings to build tail-specific deep neural network models, estimate airspeed, fuel flow, altitude, and the like during the various legs of a flight path during RTA flight. For a given flight condition, the control unit 110 iterates over a range of cost index (such as based on a predetermined inflight descent table) to determine the optimum cost index (or lowest-cost cost index).

In at least one example, the control unit 110 automatically operates one or more controls 104 of the aircraft 102 during RTA flight to automatically operate the aircraft 102 according to the determined RTA parameters. For example, the control unit 110 determines various airspeeds and altitudes for the different legs of a flight path of an aircraft 102 operating according in an RTA mode. The control unit 110 automatically operates the controls 104 to ensure that the aircraft 102 arrives at waypoints at target times. Optionally, the control unit 110 may not automatically operate the aircraft 102.

As described herein, the system 100 is for operating the aircraft 102 in the RTA mode. The system includes the control unit 110, which is configured to adapt one or more RTA parameters for the RTA mode of the aircraft 102 based on tail-specific data 122 for the aircraft 102, and/or weather conditions at different locations along a flight path of the aircraft 102 in the RTA mode.

Figure 2:
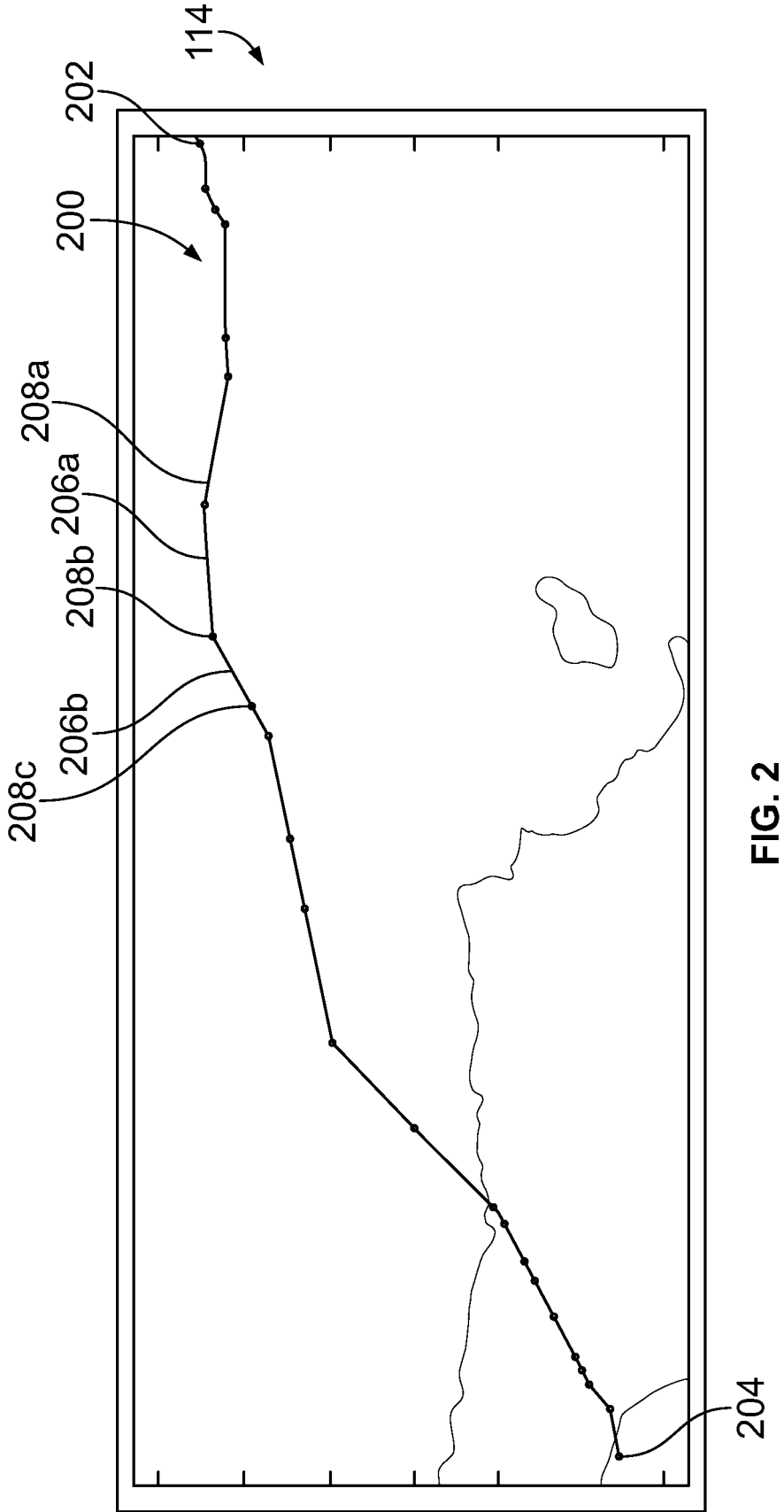
FIG. 2 illustrates a front view of a display showing a flight path, according to an example of the present disclosure.

FIG. 2 illustrates a front view of the display 114 showing a flight path 200, according to an example of the present disclosure. The flight path 200 includes a departure airport 202 and an arrival airport 204. Various legs exist between the departure airport 202 and the arrival airport 204. For example, a first leg 206a is between a first waypoint 208a and a second waypoint 208b. A second leg 206b is between the second waypoint 208b and a third waypoint 208c. The first leg 206a is longer than the second leg 206b. Referring to FIGS. 1 and 2, the control unit 110 provides an increased weight to the first leg 206a in contrast to the second leg 206b. That is, because the first leg 206a is longer than the second leg 206b, the control unit 110 determines that time can be made up in a more efficient manner during the first leg 206a, as the aircraft 102 can be flown closer to the optimal economy airspeed. As such, the control unit 110 provides an increased weight to the first leg 206a, such as RTA flight is to be adjusted during the first leg 206a before the second leg 206b.

Figure 3:
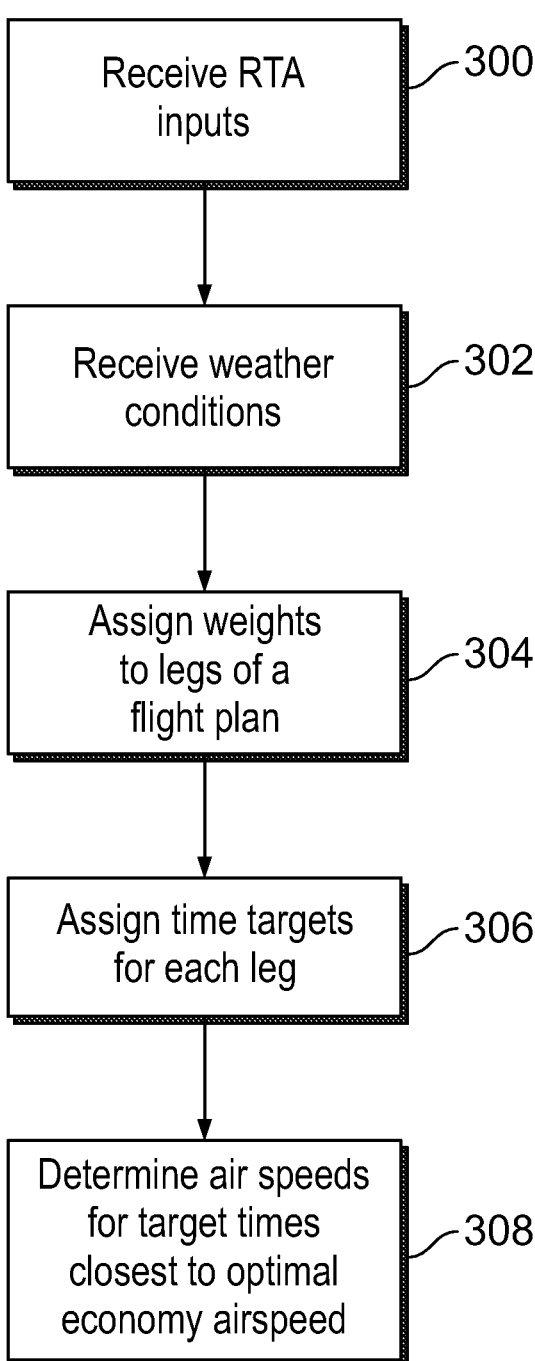
FIG. 3 illustrates a flow chart of a method, according to an example of the present disclosure.

FIG. 3 illustrates a flow chart of a method, according to an example of the present disclosure. Referring to FIGS. 1-3, the control unit 110 receives RTA inputs at 300. A pilot can provide the RTA inputs, such as through the input device 116. The RTA inputs include waypoints and legs between a departure airport and an arrival airport. At 302, the control unit 110 receives weather conditions (including temperature, precipitation, wind speed and direction, and the like), such as from the weather sub-system 118. At 304, the control unit 110 assigns weights to the legs of the flight path. For example, the control unit 110 weights longer legs higher than shorter legs, as the control unit 110 determines that time can be made up while flying the aircraft 102 at airspeeds closer to the optimal economy airspeed during longer legs. In this manner, the control unit 110 determines that airspeeds are to be adjusted during longer legs before shorter legs. That is, the control unit 110 indicates an increased airspeed during a longer leg before a shorter leg, as time can be made up during the longer leg while flying the aircraft 102 closer to the optimal economy airspeed. At 306, the control unit 110 assigns time targets for each leg of the flight path. The time targets are RTA times for each waypoint. At 308, based on the weather conditions and the tail-specific data 122 for the aircraft 102, the control unit 110 determines airspeeds for the aircraft 102 to arrive at the different waypoints at the target times. The determined airspeeds are as close as possible to the optimal economy airspeed. That is, the control unit 110 determines the airspeeds to arrive at the target time that are closest to the optimal economy airspeed, instead of a fixed airspeed, or at airspeeds that substantially deviate from the economy airspeed.

As described herein, the control unit 110 uses the tail-specific data 122 to efficiently adapt airspeeds in relation to the optimal economy airspeed. In contrast, prior known RTA modes use generic information, and do not account for tail-specific differences in performance.

Also, tail-specific cost index changes as conditions change. Accordingly, the control unit 110 provides a cost index profile along the flight path.

The control unit 110 also adapts the RTA mode based on current and predicted weather conditions, such as wind direction and wind speed at the various legs, instead of using weather info that is not current. The control unit 110 receives information regarding the latest winds, thereby ensuring efficient adaptation of RTA parameters.

Further, the control unit 110 provides dynamic weighted airspeed calculation, which causes flights segments to be optimized in relation to economy mode. The control unit 110 can assign higher weighting to legs based on how long and how close to tail-specific optimum speeds can be flown.

The control unit 110 determines the RTA parameters in relation to the optimal economy airspeed for the aircraft 102, as determined from the tail-specific data 122, instead of a fixed airspeed. As such, the aircraft flying during the RTA mode flies at dynamically adjusted, tail-specific airspeeds, which increases fuel efficiency.

The systems and methods described herein allow pilots to fly comfortably at optimal airspeeds, which will not require last minute adjustments, and save considerable amounts of fuel.

Figure 4:
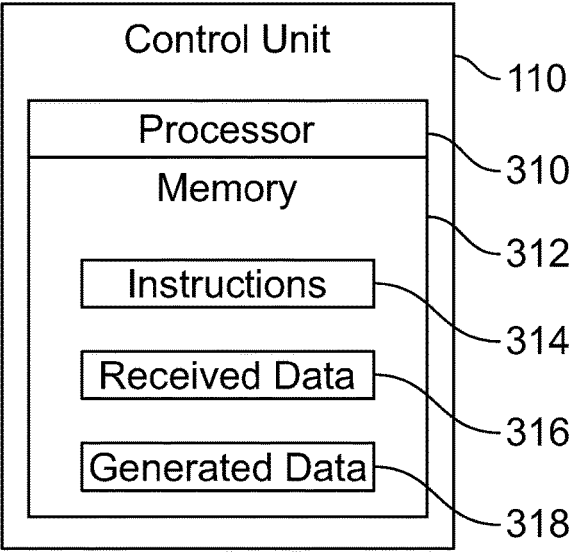
FIG. 4 illustrates a schematic block diagram of a control unit, according to an example of the present disclosure.

FIG. 4 illustrates a schematic block diagram of the control unit 110, according to an example of the present disclosure. In at least one example, the control unit 110 includes at least one processor 310 in communication with a memory 312. The memory 312 stores instructions 314, received data 316, and generated data 318. The control unit 110 shown in FIG. 4 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 110 may be or include one or more processors that are configured to control operation, as described herein.

The control unit 110 is configured to execute a set of instructions that are stored in one or more data storage units or elements (such as one or more memories), in order to process data. For example, the control unit 110 may include or be coupled to one or more memories. The data storage units may also store data or other information as desired or needed. The data storage units may be in the form of an information source or a physical memory element within a processing machine.

The set of instructions may include various commands that instruct the control unit 110 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 110. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 110 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In at least one example, the control unit 110 can further control, at least in part, the controls 104 of the aircraft 102 to operate the aircraft 102 based on the adapted RTA parameters. For example, based on the RTA parameters, the control unit 110 can automatically operate the controls 104 to increase or decrease ground or airspeed, rate of climb, and the like of the aircraft 102 based on the determined RTA parameters. As another example, based on the determined RTA parameters, the control unit 110 can automatically operate the controls 104 to increase or decrease ground or airspeed, rate of descent, and the like of the aircraft 102 based on the determined RTA parameters.

In at least one example, all or part of the systems and methods described herein may be or otherwise include an artificial intelligence (AI) or machine-learning system that can automatically perform the operations of the methods also described herein. For example, the control unit 110 can be an artificial intelligence or machine learning system.

These types of systems may be trained from outside information and/or self-trained to repeatedly improve the accuracy with how the data 108 is analyzed to determine the RTA parameters based on a plurality of flights of the aircraft 102, as well as adapt RTA parameters based on tail-specific data 122 and weather conditions. Over time, these systems can improve by determining RTA parameters with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), or the like. The systems may be trained and re-trained using feedback from one or more prior analyses of the data 108, ensemble data, and/or other such data. Based on this feedback, the systems may be trained by adjusting one or more parameters, weights, rules, criteria, or the like, used in the analysis of the same. This process can be performed using the data 108 and ensemble data instead of training data, and may be repeated many times to repeatedly improve the determination of the RTA parameters. The training minimizes conflicts and interference by performing an iterative training algorithm, in which the systems are retrained with an updated set of data (for example, data 108 received during and/or after each flight of the aircraft 102) and based on the feedback examined prior to the most recent training of the systems. This provides a robust analysis model that can better determine the most cost effective and efficient RTA parameters for the aircraft 102.

Examples of the subject disclosure provide systems and methods that allow large amounts of data to be quickly and efficiently analyzed by a computing device. For example, the control unit 110 can analyze various aspects of flights of the aircraft 102 based on the data 108 received from the sensors 106, as well as RTA information for various flight paths. Further, the control unit 110 creates variables based on the various aspects, and determines RTA parameters from the variables, which can be in a format not readily discernable by a human being. As such, large amounts of data, which may not be discernable by human beings, are being tracked and analyzed. The vast amounts of data are efficiently organized and/or analyzed by the control unit 110, as described herein. The control unit 110 analyzes the data in a relatively short time in order to quickly and efficiently determine the RTA parameters in real time. A human being would be incapable of efficiently analyzing such vast amounts of data in such a short time. As such, examples of the subject disclosure provide increased and efficient functionality, and vastly superior performance in relation to a human being analyzing the vast amounts of data.

In at least one embodiment, components of the system 100, such as the control unit 110, provide and/or enable a computer system to operate as a special computer system for determining RTA parameters for the aircraft 102. The control unit 110 improves upon computing devices that determine generic airspeeds for RTA modes by allowing for the determination of efficient RTA parameters based on tail-specific data and weather conditions.

Figure 5:
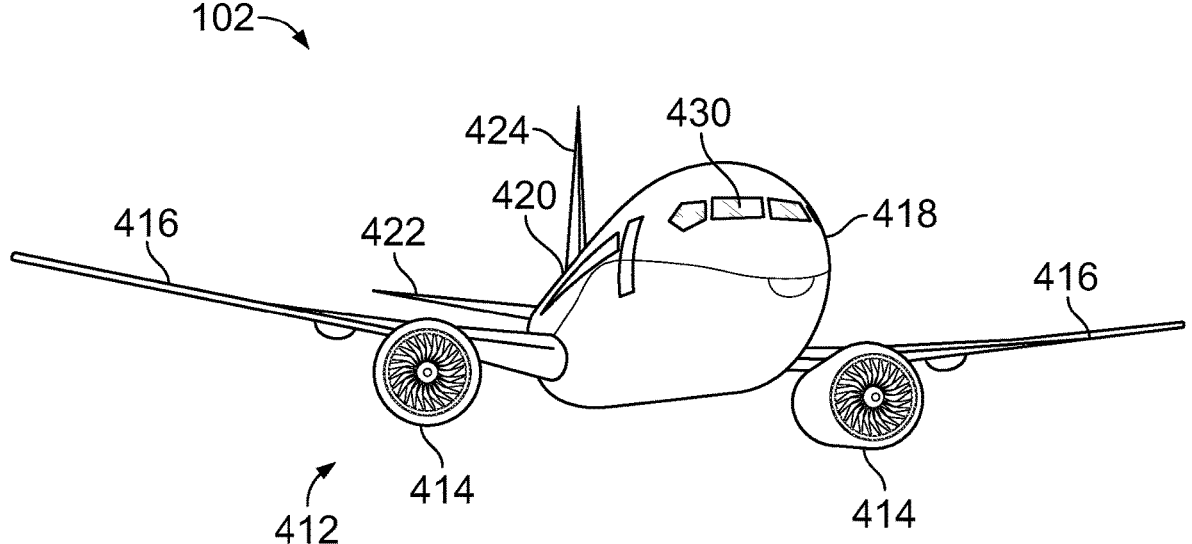
FIG. 5 illustrates a perspective front view of an aircraft, according to an example of the present disclosure.

FIG. 5 illustrates a perspective front view of the aircraft 102, according to an example of the present disclosure. The aircraft 102 includes a propulsion system 412 that includes engines 414, for example. Optionally, the propulsion system 412 may include more engines 414 than shown. The engines 414 are carried by wings 416 of the aircraft 102. In other examples, the engines 414 may be carried by a fuselage 418 and/or an empennage 420. The empennage 420 may also support horizontal stabilizers 422 and a vertical stabilizer 424. The fuselage 418 of the aircraft 102 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 5 shows an example of an aircraft 102. It is to be understood that the aircraft 102 can be sized, shaped, and configured differently than shown in FIG. 5.

Further, the disclosure comprises examples according to the following clauses:

Clause 1. A system for operating an aircraft in a required time of arrival (RTA) mode, the system comprising:

a control unit configured to adapt one or more RTA parameters for the RTA mode of the aircraft based on one or both of tail-specific data for the aircraft, or weather conditions at different locations along a flight path of the aircraft in the RTA mode.

Clause 2. The system of Clause 1, wherein the control unit is configured to adapt the one or more RTA parameters for the RTA mode of the aircraft based on the tail-specific data for the aircraft, and the weather conditions at the different locations along the flight path of the aircraft in the RTA mode.

Clause 3. The system of Clauses 1 or 2, wherein the control unit is onboard the aircraft.

Clause 4. The system of any of Clauses 1-3, wherein the weather conditions are received from a weather sub-system, and wherein the weather conditions include current weather conditions and predicted weather conditions at the different locations along the flight path.

Clause 5. The system of any of Clauses 1-4, wherein the one or more RTA parameters comprise an airspeed and an altitude.

Clause 6. The system of any of Clauses 1-5, wherein the different locations comprise different legs of the flight path.

Clause 7. The system of Clause 6, wherein the control unit is further configured to assign different weights to the different legs of the flight path based on distances of the different legs.

Clause 8. The system of any of Clauses 1-7, wherein the control unit determines the tail-specific data for the aircraft from one or more previous flights of the aircraft.

Clause 9. The system of any of Clauses 1-8, wherein the control unit is further configured to adapt an airspeed of the aircraft in the RTA mode in relation to an optimal economy airspeed of the aircraft.

Clause 10. The system of Clause 9, wherein the control unit is further configured to determine the optimal economy airspeed of the aircraft based on the tail-specific data for the aircraft.

Clause 11. The system of any of Clauses 1-10, wherein the control unit automatically operates one or more controls of the aircraft based on the one or more RTA parameters.

Clause 12. The system of any of Clauses 1-11, wherein the control unit is an artificial intelligence or machine learning system.

Clause 13. A method for system for operating an aircraft in a required time of arrival (RTA) mode, the system comprising:

a control unit configured to adapt one or more RTA parameters for the RTA mode of the aircraft based on one or both of tail-specific data for the aircraft, or weather conditions at different locations along a flight path of the aircraft in the RTA mode, the method comprising:

adapting, by the control unit, the one or more RTA parameters for the RTA mode of the aircraft based on the tail-specific data for the aircraft, and the weather conditions at the different locations along the flight path of the aircraft in the RTA mode Clause 14. The method of Clause 13, further comprising receiving the weather conditions from a weather sub-system, wherein the weather conditions include current weather conditions and predicted weather conditions at the different locations along the flight path, and wherein the one or more RTA parameters comprise an airspeed and an altitude.

Clause 15. The method of Clauses 13 or 14, wherein the different locations comprise different legs of the flight path, and wherein the method further comprises assigning, by the control unit, different weights to the different legs of the flight path based on distances of the different legs.

Clause 16. The method of any of Clauses 13-15, further comprising determining, by the control unit, the tail-specific data for the aircraft from one or more previous flights of the aircraft.

Clause 17. The method of any of Clauses 13-16, further comprising determining, by the control unit, an optimal economy airspeed of the aircraft based on the tail-specific data for the aircraft, and wherein said adapting comprises adapting an airspeed of the aircraft in the RTA mode in relation to the optimal economy airspeed of the aircraft.

Clause 18. The method of any of Clauses 13-17, further comprising automatically operating, by the control unit, one or more controls of the aircraft based on the one or more RTA parameters.

Clause 19. An aircraft comprising:

one or more controls configured to control operation of the aircraft; and a system for operating the aircraft in a required time of arrival (RTA) mode, the system comprising:

a control unit configured to:

determine tail-specific data for the aircraft from one or more previous flights of the aircraft, adapt one or more RTA parameters for the RTA mode of the aircraft based on the tail-specific data for the aircraft, and weather conditions at different locations along a flight path of the aircraft in the RTA mode, wherein the RTA parameter comprises an airspeed and altitude, and wherein the weather conditions include current weather conditions and predicted weather conditions at the different locations along the flight path, and assign different weights to different legs of the flight path based on distances of the different legs.

Clause 20. The aircraft of Clause 19, wherein the control unit is further configured to:

determine an optimal economy airspeed of the aircraft based on the tail-specific data for the aircraft, and adapt an airspeed of the aircraft in the RTA mode in relation to the optimal economy airspeed of the aircraft As described herein, examples of the present disclosure systems and methods for efficiently and effectively operating an aircraft in a required time of arrival (RTA) mode.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
an aircraft configured to operate in a required time of arrival (RTA) mode, wherein the aircraft comprises sensors configured to detect various aspects of the aircraft, and wherein the sensors are further configured to output tail-specific data indicative of the various aspects of the aircraft; and
a control unit including one or more processors configured to:

determine the tail-specific data for the aircraft from one or more previous flights of the aircraft, and
adapt one or more RTA parameters for the RTA mode of the aircraft for a current flight that occurs after the one or more previous flights based on the tail-specific data as determined from the one or more previous flights of the aircraft, and weather conditions at different locations along a flight path of the aircraft in the RTA mode,
wherein the aircraft is operated during the current flight in the RTA mode having the RTA parameters as adapted by the control unit.

2. The system of claim 1, wherein the control unit is onboard the aircraft.

3. The system of claim 1, wherein the weather conditions are received from a weather sub-system, and wherein the weather conditions include current weather conditions and predicted weather conditions at the different locations along the flight path.

4. The system of claim 1, wherein the one or more RTA parameters comprise an airspeed and an altitude.

5. The system of claim 1, wherein the different locations comprise different legs of the flight path.

6. The system of claim 5, wherein the control unit is further configured to assign different weights to the different legs of the flight path based on distances of the different legs, wherein the control unit is configured to provide an increased weighting for a longer leg of the flight path than a shorter leg of the flight path.

7. The system of claim 1, wherein the control unit is further configured to adapt an airspeed of the aircraft in the RTA mode in relation to an optimal economy airspeed of the aircraft.

8. The system of claim 7, wherein the control unit is further configured to determine the optimal economy airspeed of the aircraft based on the tail-specific data for the aircraft.

9. The system of claim 1, wherein the control unit is further configured to automatically operate one or more controls of the aircraft based on the one or more RTA parameters.

10. The system of claim 1, wherein the control unit is an artificial intelligence or machine learning system.

11. The system of claim 1, wherein the sensors comprise:
a flight recorder that records the various aspects of the aircraft including phases and legs of a flight path;
a speed sensor that detects a speed of the aircraft;
an altitude sensor that detects an altitude of the aircraft;
a position sensor that detects a position of the aircraft,
ambient sensors that detect an ambient temperature surrounding the aircraft and wind speed;
a weight sensor that detects an overall weight of the aircraft,
wherein the tail specific data for the aircraft during the one or more previous flights includes the various aspects of the aircraft during the one or more previous flight, the speeds of the aircraft during the one or more previous flights, the altitudes of the aircraft during the one or more previous flights, the positions of the aircraft during the one or more previous flights, the ambient temperatures and the wind speeds during the one or more previous flights, and weights of the aircraft during the one or more previous flights.

12. A method for a system comprising:
an aircraft configured to operate in a required time of arrival (RTA) mode, wherein the aircraft comprises sensors configured to detect various aspects of the aircraft, and wherein the sensors are further configured to output tail-specific data indicative of the various aspects of the aircraft; and a control unit including one or more processors configured to:

determine the tail-specific data for the aircraft from one or more previous flights of the aircraft, and adapt one or more RTA parameters for the RTA mode of the aircraft for a current flight that occurs after the one or more previous flights based on the tail-specific data as determined from the one or more previous flights of the aircraft, and weather conditions at different locations along a flight path of the aircraft in the RTA mode, wherein the aircraft is operated during the current flight in the RTA mode having the RTA parameters as adapted by the control unit, the method comprising:

adapting, by the control unit, the one or more RTA parameters for the RTA mode of the aircraft based on the tail-specific data for the aircraft, and the weather conditions at the different locations along the flight path of the aircraft in the RTA mode; and operating the aircraft during the current flight in the RTA mode having the RTA parameters as adapted by the control unit.

13. The method of claim 12, further comprising receiving the weather conditions from a weather sub-system, wherein the weather conditions include current weather conditions and predicted weather conditions at the different locations along the flight path, and wherein the one or more RTA parameters comprise an airspeed and an altitude.

14. The method of claim 12, wherein the different locations comprise different legs of the flight path, and wherein the method further comprises assigning, by the control unit, different weights to the different legs of the flight path based on distances of the different legs, wherein said assigning comprises increasing weighting for a longer leg of the flight path than a shorter leg of the flight path.

15. The method of claim 12, further comprising determining, by the control unit, an optimal economy airspeed of the aircraft based on the tail-specific data for the aircraft, and wherein said adapting comprises adapting an airspeed of the aircraft in the RTA mode in relation to the optimal economy airspeed of the aircraft.

16. The method of claim 12, further comprising automatically operating, by the control unit, one or more controls of the aircraft based on the one or more RTA parameters.

17. The method of claim 12, wherein the sensors comprise:

a flight recorder that records the various aspects of the aircraft including phases and legs of a flight path;

a speed sensor that detects a speed of the aircraft;

an altitude sensor that detects an altitude of the aircraft;

a position sensor that detects a position of the aircraft, ambient sensors that detect an ambient temperature surrounding the aircraft and wind speed;

a weight sensor that detects an overall weight of the aircraft, wherein the tail specific data for the aircraft during the one or more previous flights includes the various aspects of the aircraft during the one or more previous flights, the speeds of the aircraft during the one or more previous flights, the altitudes of the aircraft during the one or more previous flights, the positions of the aircraft during the previous flights, the ambient temperatures and the wind speeds during the one or more previous flights, and weights of the aircraft during the one or more previous flights.

18. An aircraft comprising:

sensors configured to detect various aspects of the aircraft, and wherein the sensors are further configured to output tail-specific data indicative of the various aspects of the aircraft;

one or more controls configured to control operation of the aircraft; and a system for operating the aircraft in a required time of arrival (RTA) mode, the system comprising:

a control unit including one or more processors configured to:

determine the tail-specific data for the aircraft from one or more previous flights of the aircraft, adapt one or more RTA parameters for the RTA mode of the aircraft for a current flight that occurs after the one or more previous flights based on the tail-specific data as determined from the one or more previous flights of the aircraft, and weather conditions at different locations along a flight path of the aircraft in the RTA mode, wherein the RTA parameter comprises an airspeed and altitude, and wherein the weather conditions include current weather conditions and predicted weather conditions at the different locations along the flight path, and assign different weights to different legs of the flight path based on distances of the different legs, wherein the aircraft is operated during the current flight in the RTA mode having the RTA parameters as adapted by the control unit.

19. The aircraft of claim 18, wherein the control unit is further configured to:

determine an optimal economy airspeed of the aircraft based on the tail-specific data for the aircraft, and adapt an airspeed of the aircraft in the RTA mode in relation to the optimal economy airspeed of the aircraft.

20. The aircraft of claim 18, wherein the sensors comprise:

a flight recorder that records the various aspects of the aircraft including phases and legs of a flight path;

a speed sensor that detects a speed of the aircraft;

an altitude sensor that detects an altitude of the aircraft;

a position sensor that detects a position of the aircraft, ambient sensors that detect an ambient temperature surrounding the aircraft and wind speed;

a weight sensor that detects an overall weight of the aircraft, wherein the tail specific data for the aircraft during the one or more previous flights includes the various aspects of the aircraft during the one or more previous flights, the speeds of the aircraft during the one or more previous flights, the altitudes of the aircraft during the one or more previous flights, the positions of the aircraft during the one or more previous flights, the ambient temperatures and the wind speeds during the one or more previous flights, and weights of the aircraft during the one or more previous flights.

* * * * *